US008010625B2

(12) United States Patent
Shibahara et al.

(10) Patent No.: US 8,010,625 B2
(45) Date of Patent: Aug. 30, 2011

(54) CONTENT STORAGE MEDIUM MAKING METHOD, COMPUTER PROGRAM, AND CONTENT PROVIDING SYSTEM

(75) Inventors: Shinsuke Shibahara, Shiki (JP); Toru Nayuki, Toshima-ku (JP); Junichiro Hara, Chiyoda-ku (JP); Shinichi Yamagishi, Setagaya-ku (JP)

(73) Assignee: Webstream Corporation, Tokyo (JP)

( * ) Notice: Subject to any disclaimer, the term of this patent is extended or adjusted under 35 U.S.C. 154(b) by 201 days.

(21) Appl. No.: 12/297,541

(22) PCT Filed: Apr. 3, 2007

(86) PCT No.: PCT/JP2007/057466
§ 371 (c)(1),
(2), (4) Date: Oct. 17, 2008

(87) PCT Pub. No.: WO2007/122988
PCT Pub. Date: Nov. 1, 2007

(65) Prior Publication Data
US 2009/0106399 A1 Apr. 23, 2009

(30) Foreign Application Priority Data
Apr. 17, 2006 (JP) ................................. 2006-113805

(51) Int. Cl.
*G06F 15/16* (2006.01)
(52) U.S. Cl. .......................... 709/217; 709/211; 709/216
(58) Field of Classification Search .................. 709/219, 709/216, 211, 217
See application file for complete search history.

(56) References Cited

U.S. PATENT DOCUMENTS

| 5,459,837 | A | * | 10/1995 | Caccavale ...................... 709/226 |
|---|---|---|---|---|
| 5,771,354 | A | * | 6/1998 | Crawford ...................... 709/229 |
| 5,901,228 | A | * | 5/1999 | Crawford ........................ 705/34 |
| 5,937,164 | A | * | 8/1999 | Mages et al. ................... 709/218 |
| 6,282,573 | B1 | * | 8/2001 | Darago et al. ................ 709/229 |
| 6,606,664 | B2 | * | 8/2003 | Darago et al. ................ 709/229 |
| 7,212,729 | B2 | * | 5/2007 | Nakajima et al. ............... 386/83 |
| 7,685,358 | B1 | * | 3/2010 | Larson et al. .................. 711/111 |
| 2001/0036268 | A1 | * | 11/2001 | Kuroda et al. ................ 380/200 |
| 2002/0076195 | A1 | * | 6/2002 | Nakajima et al. .............. 386/46 |
| 2002/0087887 | A1 | * | 7/2002 | Busam et al. ................. 713/201 |

(Continued)

FOREIGN PATENT DOCUMENTS
EP 1 162 617 4/2001

(Continued)

OTHER PUBLICATIONS

Bhogal, "Cross-Netwrk CD Burning with NeroNET", May 27, 2005, informIT, http://www.informit.comarticles/article.aspx?p=389719.*

(Continued)

*Primary Examiner* — David Lazaro
*Assistant Examiner* — Edward J Kim
(74) *Attorney, Agent, or Firm* — Cozen O'Connor

(57) ABSTRACT

A content providing technique stores content data 120, sends a program for detecting a drive 35 capable of writing on a removable medium D on a user terminal 30, sends a program for determining whether or not a removable medium D is loaded on the drive 35, sends blocks of content data 120 to the user terminal 30, sends a program for writing blocks of content data 120 successively onto the removable medium D, and stores the sent content data blocks 120 successively onto the removable medium D by the drive 35.

14 Claims, 9 Drawing Sheets

U.S. PATENT DOCUMENTS

| | | |
|---|---|---|
| 2003/0041123 A1 | 2/2003 | Sato et al. |
| 2004/0210896 A1* | 10/2004 | Chou et al. .................... 717/174 |
| 2007/0014535 A1* | 1/2007 | Rathbun et al. ................. 386/94 |
| 2007/0143443 A1* | 6/2007 | Johannsen .................... 709/218 |

FOREIGN PATENT DOCUMENTS

| | | |
|---|---|---|
| JP | 10-177764 | 6/1998 |
| JP | 2001-307427 | 11/2001 |
| JP | 2003-044058 | 2/2003 |
| JP | 2003-230121 | 8/2003 |
| JP | 2005-044312 | 2/2005 |

OTHER PUBLICATIONS

Myce, "Alcohol 120% gives "No Disc" message after simulation", Jul. 30, 2005.*

NeroNET Server Download (NeroNET Server download page, from www.itnews.com.au, Jun. 17, 2005).*

* cited by examiner

CONTENT STORAGE MEDIUM MAKING METHOD, COMPUTER PROGRAM, AND CONTENT PROVIDING SYSTEM

RELATED APPLICATIONS

This is a U.S. National Phase Application under 35 USC 371 of International Application PCT/JP2007/057466 filed on Apr. 3, 2007.

This application claims the priority of Japanese patent application no. 2006-113805 filed Apr. 17, 2006, the content of which is hereby incorporated by reference.

TECHNICAL FIELD

This invention relates to a content storage medium making method, computer program, and content providing system, specifically, a content storage medium making method which can provide content data regardless of the maximum volume of data that a client-side terminal can handle, a computer program for performing this content storage medium making method on computers, and a content providing system for this content storage medium making method.

BACKGROUND ART

Packet streaming technology is one of the conventional methods for delivering moving-image content via communication lines. Streaming is a method of playing back content data, of which a content provider server holds, by means of a playback program installed on a user computer while downloading the content data. There is another providing method, in which a playback program plays back content data after all the blocks of content data are once downloaded to a hard disk drive provided on a user computer. In order to play back the downloaded content data on a device other than that computer, the user needs to copy the content data, which is downloaded on the hard disk drive of the computer, to a storage medium such as a DVD (hereinafter referred to as a removable medium). The content data copied on the removable medium can be played back on another computer, a DVD player, etc.

DISCLOSURE OF THE INVENTION

However, not all user computers have the most advanced specification (hardware and software capabilities). Further, client computers in which free space on a hard disk drive and allowable file size for a file system adopted imposes a limitation on the data volume that can be handled may not be able to download the content data onto the hard disk drive.

Moreover, the content providing methods mentioned above allow the content data, which is downloaded on the hard disk drive of a computer, to be copied onto a removable medium such as a DVD. This allows the content data to be replicated against the provider's intention.

The present invention has been created to solve such problems with the prior art. An object of the present invention, therefore, is to provide a content storage medium making method which can provide content data regardless of the limitation on data volume that a client can handle and can prevent replication of content data against a provider's intention, a computer program, and a content providing system for this content storage medium making method.

In order to achieve the above object, the present invention provides a content storage medium making method, in which a server connected to a specific network sends content data, held in the server in advance, to the network, and a client connected to the network receives the content data sent from the server and writes it onto a removable medium.

Specifically, in order to send content data to a client, whether or not the client has a drive capable of writing the content data directly onto a removable medium and whether or not a writable removable medium is loaded on the drive have to be detected. Depending on the result of the determination mentioned above, the content data will be sent to the client. The server sends blocks of content data, each upon a request from the client, and the blocks of content data sent are successively written on the removable medium to be saved thereon.

The content storage medium making method according to the present invention, configured as described above, includes a step of detecting a drive for writing content data on a removable medium, which makes it possible to confirm that the delivery of content data is allowable before starting the delivery. Further, this making method includes a step of determining whether or not a removable medium is loaded on the drive, which reduces the frequency of removable-medium writing errors. Here, the removable medium is, for example, an optical disc such as a DVD or a CD.

In the present invention, such circumstances that the content storage medium making method is provided in the form of a computer program run on computers would be desirable.

The computer program is prepared to make computers perform the above-described content storage medium making method. Specifically, the part of the program that specifies the step of sending content data is run on the server, while the parts that specify the step of receiving content data, the step of detecting a drive, and the step of determining whether or not a removable medium is loaded on the drive are run on the client.

The present invention further provides a content providing system comprising a server connected to a specific network to send content data, held therein in advance, to the network, and a client connected to the network to receive content data sent from the server and write it on a removable medium.

The client comprises a drive allowing a removable medium to be loaded thereon to write content data sent from the server on it, and the server comprises a storage means for storing content data, a drive detection program for determining whether or not the client has a drive, a drive detection program sending means for sending the drive detection program to the client, a removable medium detection program for determining whether or not a writable removable medium is loaded on the drive, a removable medium detection program sending means for sending the removable medium detection program to the client, a content data sending means for sending blocks of content data stored in the storage means to the client over the network, each upon a request from the client, a writing program for writing the blocks of content data each sent by the content data sending means successively onto a removable medium on the client, thereby saving the content data thereon, and a writing program sending means for sending the writing program to the client.

In this content providing system of the present invention, desirably, the client comprises a fixed medium device incorporated in the client and capable of storing content data thereon, and the server further comprises a fixed medium storage prevention program to be executed by the client, which prevents content data received by the client from being written successively on the fixed medium device, thereby preventing the content data from being stored thereon, and a fixed medium storage prevention program sending means for sending the fixed medium storage prevention program to the client.

The present invention further provides a content providing system comprising a server connected to a specific network to send content data, held therein in advance, to the network, and a client connected to the network to receive content data sent from the server and write it on a removable medium loaded on a drive, wherein the client comprises a drive detection means for determining whether or not a drive exists, a removable medium detection means for determining whether or not a writable removable medium is loaded on the drive, a determination result sending means for sending the results of determination by the drive detection means and the removable medium detection means to the server providing content, and a writing means for writing blocks of content data each sent from the server depending on the results of the determination, each upon a request from the client, successively onto a removable medium, thereby saving the content data thereon.

In one aspect of this content providing system according to the present invention, the client comprises a fixed medium device incorporated in the client and capable of storing content data thereon, and the server further comprises a fixed medium storage prevention program to be executed by the client, which prevents blocks of content data each received by the client from being written successively on the fixed medium device, thereby preventing the content data from being stored thereon, and a fixed medium storage prevention program sending means for sending the fixed medium storage prevention program to the client.

Further, in one aspect of the content providing system according to the present invention, the fixed medium storage prevention program includes an improper drive detection program for determining whether or not an improper drive for which writing is prohibited in advance is provided on the client, and the content providing system comprises a writing prohibiting means for prohibiting writing onto a removable medium by the writing program, when the improper drive detection program determines that an improper drive for which writing is prohibited is provided on the client.

In a preferred aspect of the content providing system according to the present invention, the server comprises a pattern file storage means holding the improper drive detection program for prohibiting an improper drive from writing onto a removable medium, and a pattern file sending means for sending the improper drive detection program held in the pattern file storage means, to the client; and the client comprises a pattern file receiving means for receiving the improper drive detection program for prohibiting an improper drive from writing onto a removable medium, sent by the pattern file sending means.

This content providing system prevents content data from being saved on a fixed medium such as a hard disk drive (improper drive) by means of a virtual drive or wiretapping software, and so forth against the provider's intention.

In the content providing system according to the present invention, the storage medium is particularly an optical disc writable by the drive. The optical disc is a writable storage medium, such as a DVD-R or a CD-R.

The content providing system according to the present invention, described above, allows a volume of data commensurate with the capabilities of the client to be written on a removable medium, successively. The content providing system according to the present invention, described above, can deliver content data also to a client whose OS imposes a limit on the data volume that the client can handle, for example. It goes without saying that the content providing system of the present invention can deliver content without impairing a voice switch function, etc. as provided in the case of moving-image content (such as movies) sold in packages, for example.

Further, the content providing system of the present invention comprises the writing program sending means for sending a program for writing content data sent to the user terminal, successively onto a removable medium. This is a more convenient means for distributing the program to users, compared with distributing software in packages. For this reason, this content providing system of the present invention enables the content data to be delivered via communication lines also to a client whose OS imposes a limit on the data volume that the client can handle, for example.

Moreover, the content providing system of the present invention includes a means for preventing writing onto a fixed medium, which can prevent replication of content data against the provider's intention.

BEST MODE OF CARRYING OUT THE INVENTION

Figure 1A:
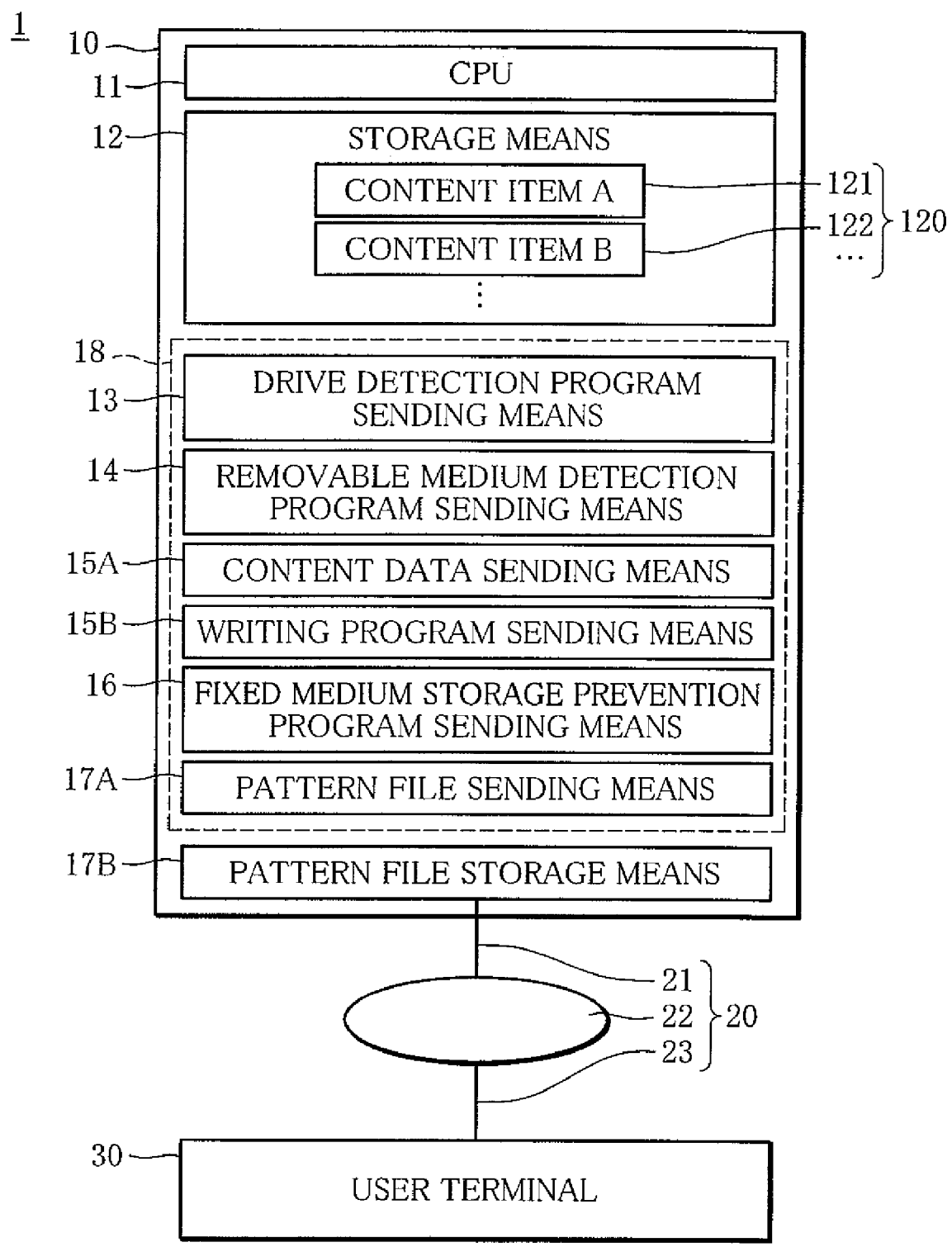
[FIG. 1A] A diagram showing configuration of a provider server in a content providing system according to an embodiment of the present invention.

Referring to the drawings, embodiments of the present invention will be described. In the drawings, the same or corresponding devices are assigned the same or like reference characters to omit repetitious descriptions.

Figure 1B:
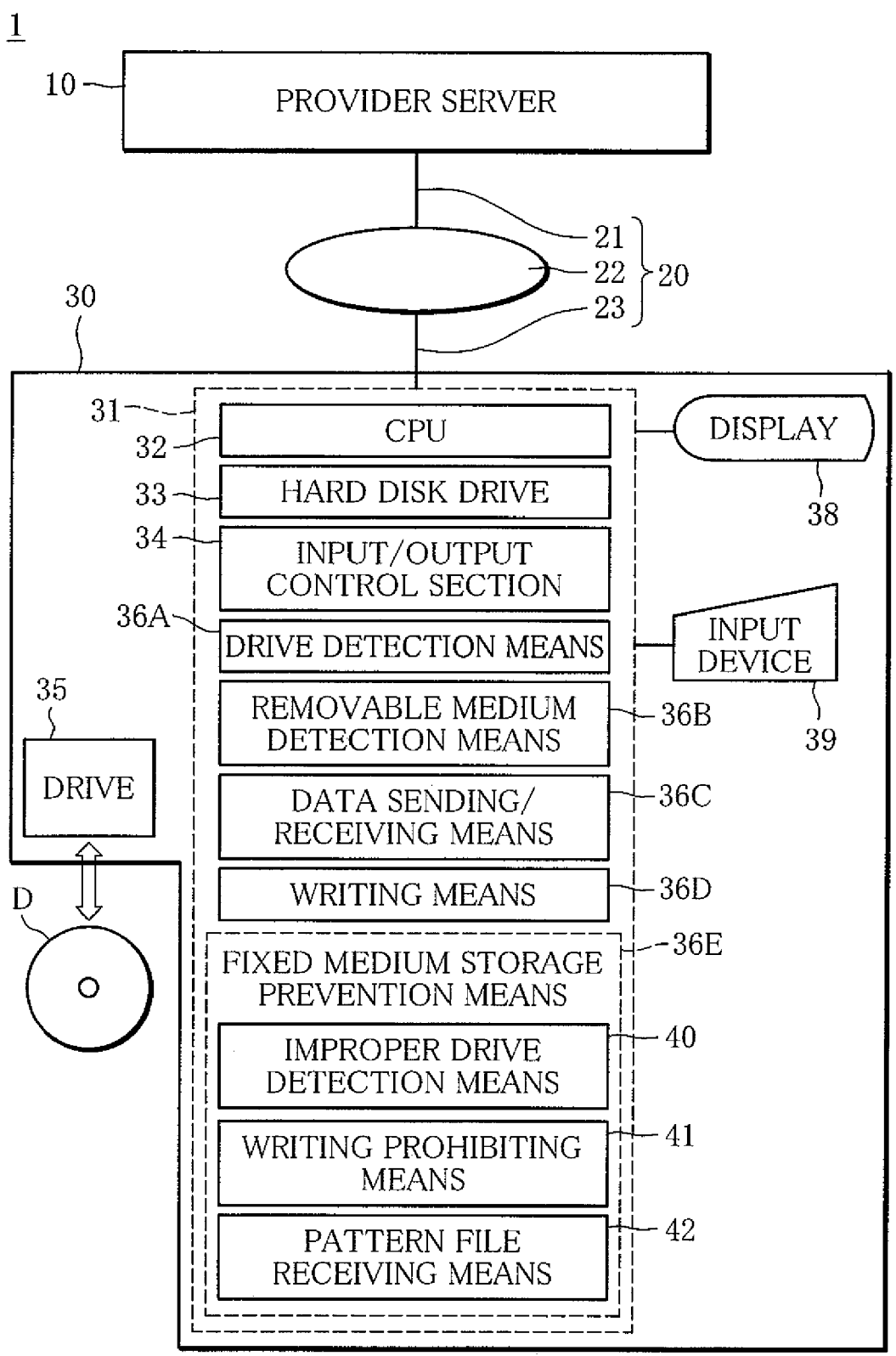
[FIG. 1B] A diagram showing configuration of a provider server in the content providing system according to the embodiment of the present invention.

First, referring to FIGS. 1A and 1B, configuration of a content providing system 1 according to a first embodiment of the present invention will be described. FIG. 1A is a diagram showing configuration of a provider server for the content providing system 1 of the present invention, while FIG. 1B is a diagram showing configuration of a user terminal for the content providing system 1 of the present invention. The content providing system 1 includes a provider server (hereinafter referred to as a server) 10, which is a content providing system according to a second embodiment, and a user terminal (hereinafter referred to as a client) 30, which is a content providing system 1 according to a third embodiment.

The server 10 is composed of a computer, for example. The server 10 comprises at least the following parts;

(1) a main control section (hereinafter referred to as a CPU) 11 which controls operation of the entire server 10,
(2) a storage means 12 for storing a plurality of content items,
(3) a drive detection program sending means 13 for sending a client 30 a drive detection program for detecting a drive 35 provided on the client 30,
(4) a removable medium detection program sending means 14 for sending the client 30 a removable medium detection program for determining whether or not a removable medium is loaded on the drive 35,
(5) a content data sending means 15A for sending the client 30 content data held in the storage means 12, and
(6) a writing program sending means 15B for sending the client 30 a program for writing content data sent to the client 30 by the content data sending means 15A, onto a removable medium. Incidentally, the drive 35 has functions of loading a removable medium D thereon, writing content data on the removable medium D and reading it therefrom.

Desirably, the server 10 should further comprise a fixed medium storage prevention program sending means 16 for preventing content data from being saved on a fixed medium such as a hard disk drive provided on the client 30, a pattern file storage means 17B which had a function of detecting an improper drive 35, and a pattern file sending means 17A for sending, information on drive 35, which the pattern file storage means 17B holds, to the client 30.

The server 10 configured as described above is connected via network cable 21 to a network 22, such as the Internet, to which a plurality of clients 30 are connected.

The drive detection program sent by the drive detection program sending means 13, the removable medium detection program sent by the removable medium detection program sending means 14, the writing program sent by the writing program sending means 15B, and the fixed medium storage prevention program sent by the fixed medium storage prevention program sending means 16 are sent to the client 30 as a set of programs. This program set will be referred to as a client program Pc (not shown in FIG. 1A) to easily distinguish it from other programs.

The client program Pc is installed to be ready for run, for example as an ActiveX control, through a browser provided on the client 30. The client program Pc is prepared in a manner not permitting the client 30 to alter it or execute it not in compliance with a determined procedure.

Next, the components of the server 10 will be described.

The CPU 11 has internal memory (not shown in FIG. 1A) for storing control programs such as an OS (Operating System) (not shown in FIG. 1A), and a program specifying a procedure for sending the client program Pc and content data 120 to the client 30 (hereinafter referred to as a sending program 18). The sending program 18 includes the above-mentioned drive detection program sending means 13, removable medium detection program sending means 14, content data sending means 15A, writing program sending means 15B and fixed medium storage prevention program sending means 16. The control programs and sending program 18 are distinct from the client program Pc.

The storage means 12 stores content data 120 in the form of digital data. Specifically, the storage means 12 is composed of storage means such as a hard disk drive, optical discs, etc. Desirably, the storage means 12 should store content data 120 in an encrypted form. If, in the content providing system 1 of the present invention, content data 120 is stored in the storage means 12 in an encrypted form, unauthorized use of content data 120 leaked due to unexpected causes, for example, can be prevented. In the storage means 12, a plurality of content items 120, such as content item A 121 and content item B 122, are stored. In the following, "the content item 120" is a generalized reference to such content items including the content items 121 and 122.

The content item 120 is a sequence of information for persons (users) to see and hear. Specifically, it may be a series of moving images, such as a movie, news, a sport video or an animated cartoon. The content item 120 is of course not restricted to such moving images but may be still images, music, a video game, an electronic publication such as a novel, or a combination thereof in a digital format. The content item 120 may include 5.1 channel surround sound data, bilingual (language-switchable) voice data, chapter information or the like in addition to a sequence of information of a type mentioned above.

The drive detection program (not shown in FIG. 1A) constitutes a part of the client program Pc and is stored on the hard disk drive of the server 10. The drive detection program sending means 13 constitutes a part of the sending program executed by the CPU 11. The drive detection program sending means 13 sends the drive detection program stored on the hard disk drive of the server 10 to the client 30 via the network cable 21 connected to the network 22.

The removable medium detection program (not shown in FIG. 1A) is a program for determining whether or not a removable medium D for content data 120 to be written on is loaded on the drive 35 on the client 30. This program constitutes a part of the client program Pc and is stored on the hard disk drive of the server 10. The removable medium detection program sending means 14 sends the removable medium detection program to the client 30 via the network cable 21 connected to the network 22.

The content data sending means 15A sends content data 120 held in the storage means 12 to the client 30 over the network 22 in a manner such that a data block of an appropriate size (a certain number of packets, for example) is sent upon a request from the client 30 at a time. The client 30 requests the content data sending means 15A to send an appropriate volume of data, while recognizing the progress of writing of content data 120 onto the removable medium D. This prevents the content data 120 from being sent from the server 10 at a rate exceeding the processing capabilities of the client 30.

The writing program (not shown in FIG. 1A) is a program for writing content data blocks 120 sent from the server 10 onto a removable medium D loaded on the drive 35. This writing program is stored on the hard disk drive of the server 10. The writing program sending means 15B sends the writing program to the client 30.

The fixed medium storage prevention program (not shown in FIG. 1A) prevents content data 120 sent to the client 30 from being written (stored) on a hard disk drive 33 provided on the client 30. The fixed medium storage prevention program sending means 16 sends this fixed medium storage prevention program to the client 30.

The server 10 configured as described above is connected to the client 30 over the network 22 such as the Internet.

Next, the client 30 will be described.

The client 30 comprises a computer main body 31 including a CPU 32 which constitutes a main control section controlling the entire client 30, a hard disk drive 33 which includes a fixed medium for storing various data and can write and read data to and from the fixed medium, and an input/output control section 34 which manages and controls data input/output operation of a specified input/output device under the control of the CPU 32; a drive 35 which allows a removable medium D (optical disc such as a DVD or a CD, for example) to be loaded thereon to read and write data from and to the removable medium D loaded; a display 38 for presenting the result or status of processing of the computer main body 31; and an input device 39, such as a keyboard or a mouse, which allows a user to enter a choice of content, etc. The client 30 is connected to the network 22 via network cable 23. In the following description, there might be a case that the network cables 21 and 23, which are connected to the network 22, as well as the network 22 are collectively referred to as a computer network 20.

The computer main body 31 further includes a drive detection means 36A for determining whether or not a drive 35 exists, a removable medium detection means 36B for determining whether or not a writable removable medium D is loaded on the drive 35, a data sending/receiving means 36C for sending and receiving data to and from the server 10, a writing means 36D for writing content data 120 onto a removable medium D, and a fixed medium storage prevention means 36E for preventing content data 120 from being written on the hard disk drive 33.

The fixed medium storage prevention means 36E includes an improper drive detection means 40 for determining whether or not a drive for which writing is prohibited in advance is provided on the client 30, and a writing prohibiting means 41 for prohibiting writing onto a removable medium D by the writing means 36D, when the improper drive detection means 40 determines that a drive for which writing is prohibited is provided on the client.

The drive 35, display 38, and input device 39 of the client 30 are connected to the computer main body 31.

The CPU 32 receives the client program Pc sent from the server 10 and performs the functions of the drive detection means 36A, removable medium detection means 36B, data sending/receiving means 36C, writing means 36D and fixed medium storage prevention means 36E. The client program Pc may be partly or wholly installed into the hard disk drive 33. The input/output control section 34 of the computer main body 31 controls transmission of signals between input/output devices, such as the display 38 and the input device 39, and the CPU 32 or a main storage device (not shown in FIG. 1B).

Next, the main components of the client 30 will be described.

The drive 35 writes (stores) content data 120 on a removable medium D, mainly an optical disc (DVD, CD or the like). The drive 35 may be provided integrally with the computer main body 31. The drive 35 can also read content data 120 stored on the removable medium D.

It is to be noted that the drive 35 does not include a removable medium D in the main body. In other words, the drive 35 is not formed integrally with a removable medium D. The removable medium D refers to a storage medium normally used in a manner that it is not fixed to the client 30. Specifically, for removable media D, pigment change optical discs (DVD-R, CD-R, etc.) and phase change optical discs (DVD-RW, CD-RW, etc.) are used. Such removable media D can be played back on DVD players, CD players and the like.

Removable media D are not restricted to the optical discs but can be card-type storage media such as memory cards. To sum up, removable media D are storage media not integrated into the drive 35. In other words, removable media D are storage media that can be easily removed from the drive 35 without requiring a special tool. In contrast, the hard disk drive 33 constituting part of the client 30 is a drive formed integrally with a storage medium. The medium of the hard disk drive 33 is also called a fixed medium. Although not shown in FIG. 1B, the medium of a hard disk drive externally attached to the computer main body 31 is also a kind of fixed medium.

The drive detection means 36A determines whether or not a drive 35 exists by executing the drive detection program installed on the client 30. The drive detection means 36A detects a drive 35 from among the devices (A: flexible disc drive, C: hard disk drive, E: drive 35, etc., for example) detected by the OS installed on the client 30. If a plurality of drives 35 are connected to the client 30, the drive detection means 36A detects all those drives 35. The drive detection means 36A sends the detection result to the server 10 using the data sending/receiving means 36C when no drive 35 is detected or a plurality of drives 35 are detected. Alternatively, it may be configured such that the drive detection means 36A sends connection information on drive 35 to the server 10 in all cases (including cases where a single drive 35 has been detected).

The removable medium detection means 36B determines whether or not a writable removable medium D is loaded on the drive 35 by executing the removable medium detection program installed on the client 30. Here, the writable removable medium D refers to a removable storage medium which is loaded on the drive 35, allows the writing of data by the drive 35 and has free space enough to store desired content data 120 wholly. The removable medium detection means 36B sends the detection result to the server 10 using the data sending/receiving means 36C when a writable removable medium D is not loaded on the drive 35. Alternatively, it may be configured such that the removable medium detection means 36B sends removable medium D loading information to the server 10 in every case.

The data sending/receiving means 36C sends the detection results by the drive detection means 36A and the removable medium detection means 36B to the server 10, under the control of the control programs such as the OS installed on the client 30. The data sending/receiving means 36C also receives blocks of content data 120 sent from the server 10. The content data 120 is, for example, formatted into packets of a determined size to be sent from the server 10 to the client 30.

The writing means 36D writes blocks of content data 120 sent from the server 10, successively onto a removable medium D loaded on the drive 35 in a manner forming tracks, sectors or clusters thereon, by executing the writing program installed on the client 30, where the writing means requests the server 10 to send data while recognizing the progress of writing by the drive 35. Here, writing successively onto the removable medium D means that the client 30 requests the server 10 to send a block of content data at a time, and writes the received data block onto the removable medium D on a block-by-block basis, instead of writing the entire content data 120 on the removable medium D after downloading it. If content data 120 is stored in the storage means 12 of the server 10 in an encrypted form and delivered from the server 10 in the encrypted form, the writing means 36D decrypts the encrypted content data 120 and then writes it onto the removable medium D.

The fixed medium storage prevention means 36E places restrictions on storing of content data 120 sent from the server 10, onto a fixed medium such as a hard disk drive by the writing program installed on the client 30, thereby preventing replication of content data 120 on the client 30.

More specifically, the fixed medium storage prevention means 36E includes an improper drive detection means 40 and a writing prohibiting means 41. The improper drive detection means 40 receives, from the server 10, information on drives for which writing is prohibited (improper drives), and determines whether or not an improper drive is provided on the client 30. The drives for which writing is prohibited include, for example, software emulating a DVD drive or a CD drive capable of writing on a fixed disc such as a hard disk drive, software parasitic in a driver controlling writing of the drive 35 to pick up content data written on a removable disc D, etc. (hereinafter referred to as improper drives). To sum up, the improper drive refers to every means that writes content data on devices not intended by the content provider.

The information on detection of improper drives is delivered from the server 10 as a pattern file in advance. The pattern file obtains information that specifies improper drives by a specific means in advance and is stored in a pattern file storage means 17B of the server 10. The information specifying improper drives includes name information such as vendor names and product names of programs which constitutes improper drives, ID information which identifies hardware, module names of programs, etc. Whether or not such information on the client coincides with improper drive information is determined by pattern matching, for example.

The pattern file may be prepared as a program code file, instead of a data file, to allow easy extension of detection principles and types of information subjected to matching in detection. Separating the improper drive detection code in the form of a pattern file, from the client program executed by the drive detection means 36A, removable medium storage detection means 36B, data sending/receiving means 36C, writing means 36D and fixed medium storage prevention means 36E, provides benefits such as easy updating of the detection code.

Desirably, the pattern file should be updated regularly, like the services operated by so-called antivirus software. The pattern file is kept in the pattern file storage means 17B and regularly sent to the client 30 by the pattern file sending means 17A. The client 30 receives the pattern file sent from the server 10 by the pattern file receiving means 42 and keeps it on the hard disk drive 33 or the like. This makes it possible to prevent content data 120 from being copied to a removable medium D such as a DVD after storing it on a fixed medium such as the hard disk drive 33.

Thus, the content providing system 1 of the present invention can prevent replication of content data 120 against the content provider's intention, thereby enabling smooth handling of rights such as copyrights.

Figure 2:
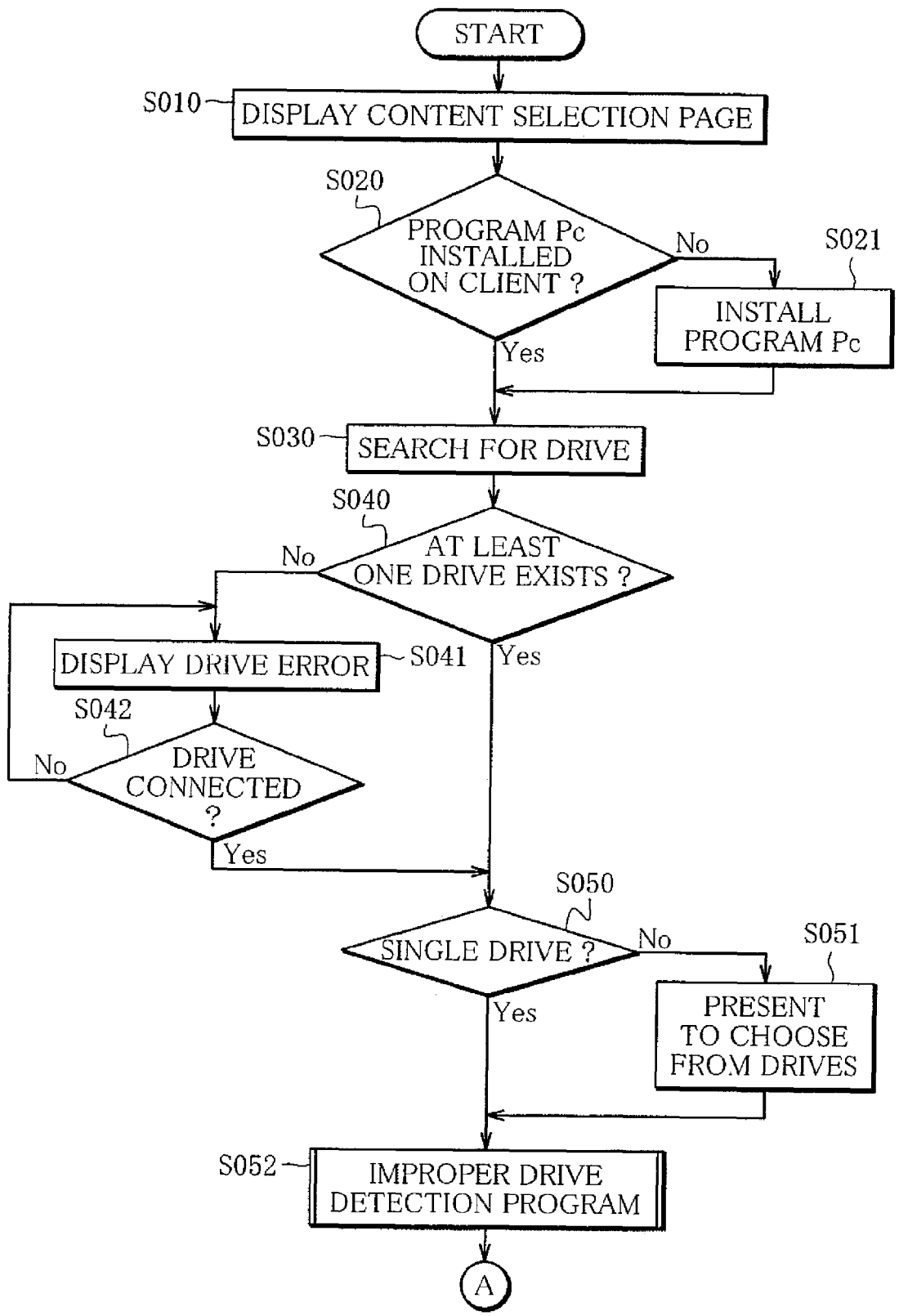
[FIG. 2] A flowchart showing part of a procedure for sending content data from the provider to the user.
Figure 3:
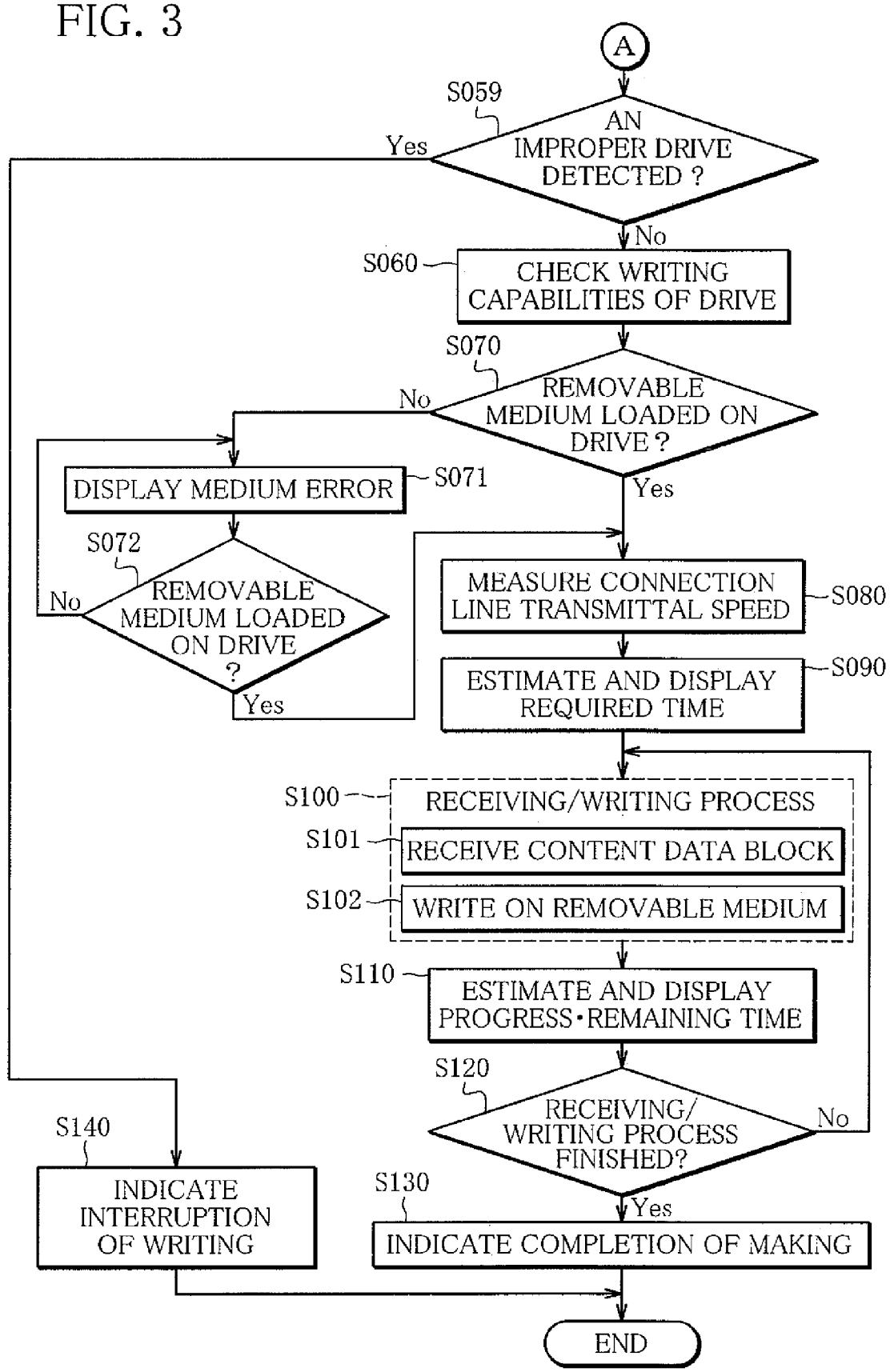
[FIG. 3] A flowchart showing part of a procedure for sending content data from the provider to the client, which follows the part shown in FIG. 2.
Figure 4:
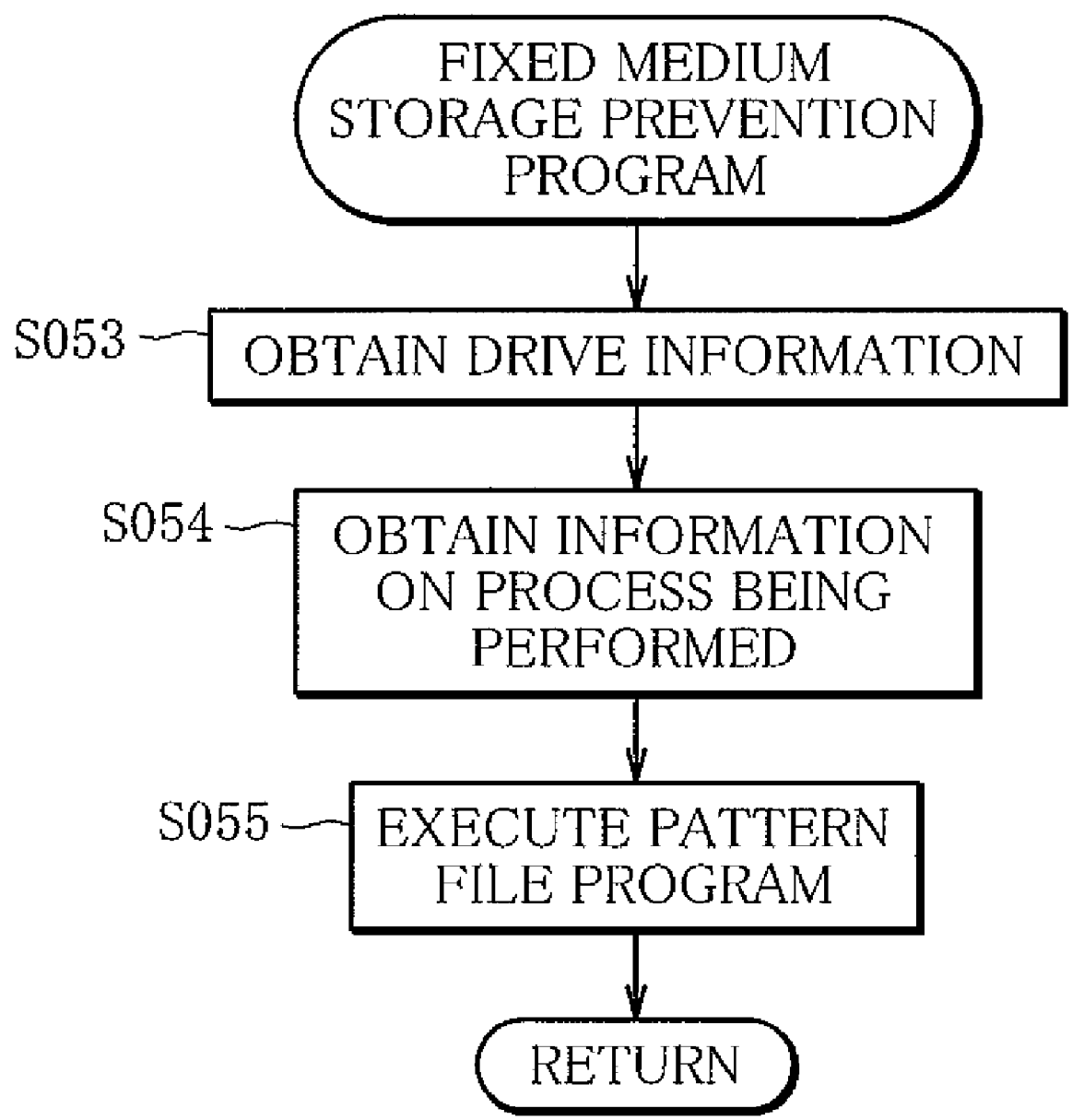
[FIG. 4] A flowchart showing a procedure specified by an improper drive detection program, indicated in the flowchart of FIG. 2.

Next, referring to FIGS. 2 to 4, the procedure for sending content data 120 from a provider to a user in the above-described content providing system 1 will be described. FIGS. 2 to 4 are a flowchart showing the procedure for sending content data 120 from a provider to a user. In the following description, FIGS. 1A and 1B will be referred to as necessary. In the description, a removable medium D with content data 120 stored thereon will be called a content storage medium Ds.

Figure 5:
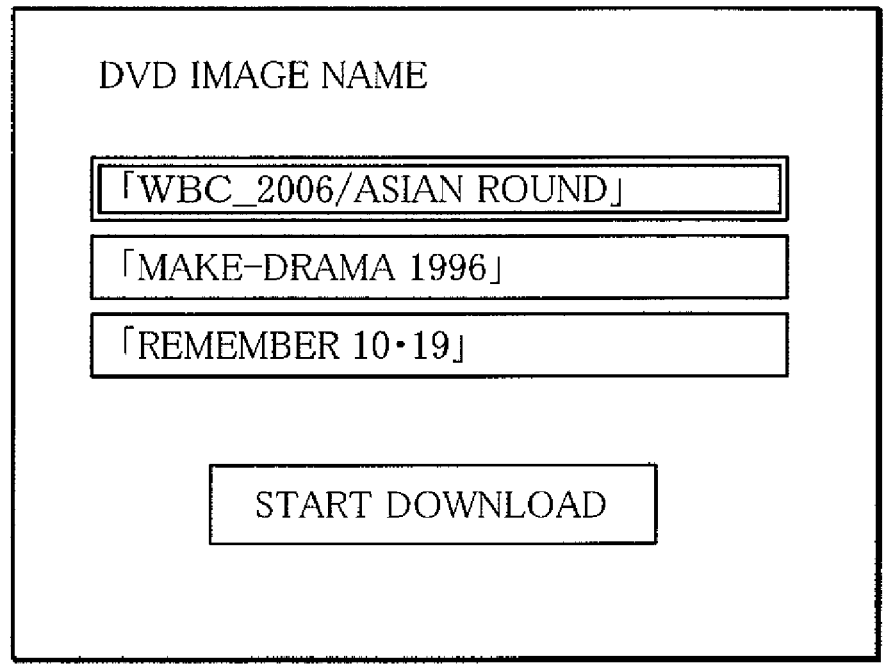
[FIG. 5] A diagram showing an example of a content selection page.

A user who intends to purchase content runs a browser on a client 30 and accesses a server 10 by specifying the address (URL) of the server 10. The server 10 accessed by the user delivers a content selection page, which allows the user to select from deliverable content items stored in the storage means 12, to the client 30 so as to be displayed on the display 38 of the client 30 (S010). The selection page is displayed as shown in FIG. 5, for example. This content selection page presents three content items "WBC 2006/Asian Round", "Make-drama 1996" and "Remember 10.19". The user selects a desired content item from the presented content items. FIG. 5 shows an example in which "WBC 2006/Asian Round" has been selected and is highlighted.

Referring back to FIG. 2, the description of the flow will be continued. After a content item is selected, the client 30 determines whether or not the client program Pc is installed on the client 30 (S020). This determination is made, for example by determining whether or not a file of the client program Pc with a specified file name exits on the client 30.

When determining, at step S020, that the client program Pc is not installed on the client 30, the client 30 downloads the client program Pc from the server 10 and installs it (S021). When determining that the client program Pc is already installed at step S020 or after installing it at the above step (S021), the client 30 proceeds to the next step. Incidentally, the "download start" button on the content selection page shown in FIG. 5 appears after the client program Pc is installed on the client 30.

After the client program Pc is installed, the client 30 searches itself for a drive 35. After searching (S030), the client 30 determines whether or not at least one drive 35 exists on the client 35 (S040).

Figure 6:
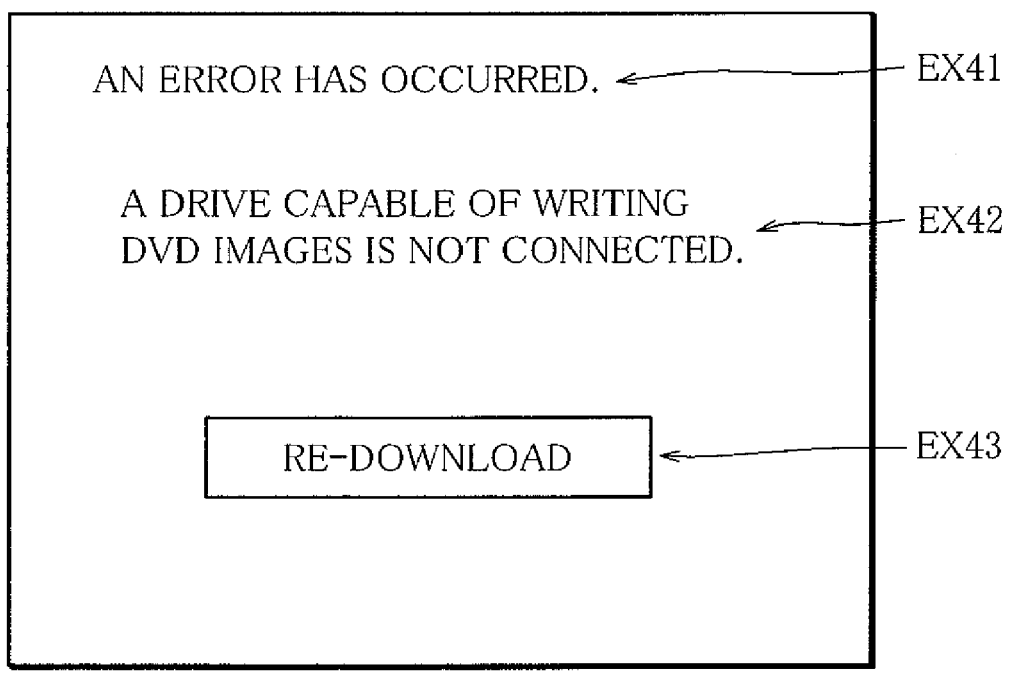
[FIG. 6] A diagram showing an example of a drive error indication page.

If determining, at step S040, that no drive 35 exists on the client 30, the client 30 displays, on the display 38 of the client 30, an error message to notify that no drive 35 exists (S041). In this case, for example, a message title EX41, an error message EX42, and a redo button EX43 are displayed on the display 38 as shown in FIG. 6. When this error message is displayed, the user connects a drive 35 to the client 30 and then presses the redo button EX43 so that the client 30 continues the procedure.

Referring back to FIG. 2, the description of the flow will be continued. When the user presses the redo button EX43 (see FIG. 6) after the drive 35 error message is displayed at step S041, the client 30 determines whether or not a drive 35 has been connected to the client 30 (S042). If still no drive 35 is connected to the client 30, the client 30 returns to step S041 to display, on the display 38 of the client 30, an error message to notify that no drive 35 exists, and then repeats the subsequent steps.

When determining that a drive 35 has been connected at step S042 or determining that at least one drive 35 exists at step S040, the client 30 determines whether or not it has a single drive 35 (S050). If the client 30 has two or more drives 35, the client 30 displays, on the display 38 of the client 30, a message to urge the user to select one from the drives 35 (S051).

Figure 7:
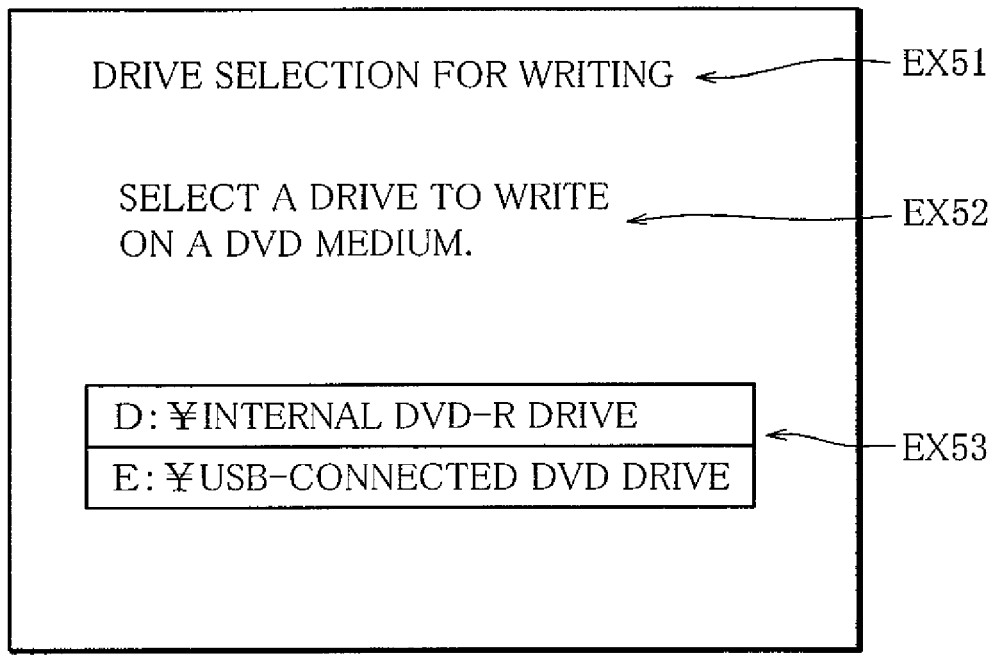
[FIG. 7] A diagram showing an example of a page presenting selectable drives.

FIG. 7 shows an example of a message to urge the user to select a drive from the drives 35 presented on the display 38. FIG. 7 shows how a message title EX51, a message EX52, and options for drives EX53 are displayed on the display 38. This example shows a list of choices of drive 35, shown in EX53, that a user can choose either an internal DVD-R drive incorporated in the client 30 or an external DVD drive USB-connected to the client.

Referring back to FIG. 2, the description of the flow will be continued.

After performing step S50 or S51, the client 30 executes the improper drive detection program (S052). As shown in FIG. 4, the improper drive detection program includes a step of obtaining information on the drive provided on the client 30 (S053) and a step of obtaining information on the process being performed (S054). The pattern file program determines whether or not the information obtained includes information on improper drives (S055).

If no improper drive is detected at step S052 by executing the improper drive detection program, the client 30 checks the writing capabilities of the single drive 35 recognized at the step (S050) of determining whether or not the client 30 has a single drive 35, or of the drive 35 selected from two or more drives 35 (S060). The information on writing capabilities obtained is used in determining whether or not a removable medium D loaded on the drive 35 is available.

Then, the client 30 determines whether or not a writable removable medium D is loaded on the drive 35 (S070). If a writable removable medium D is not loaded on the drive 35, the client 30 displays, on the display 38 of the client 30, an error message to notify this (S071). The cases where a writable removable medium D is not loaded on the drive 35 include not only cases where no removable medium D is loaded on the drive 35, but also cases where a removable medium D loaded on the drive 35 does not have free space enough to store content data 120 intended to be obtained and cases where a removable medium D incompatible with the selected drive 35 is loaded thereon.

Figure 8:
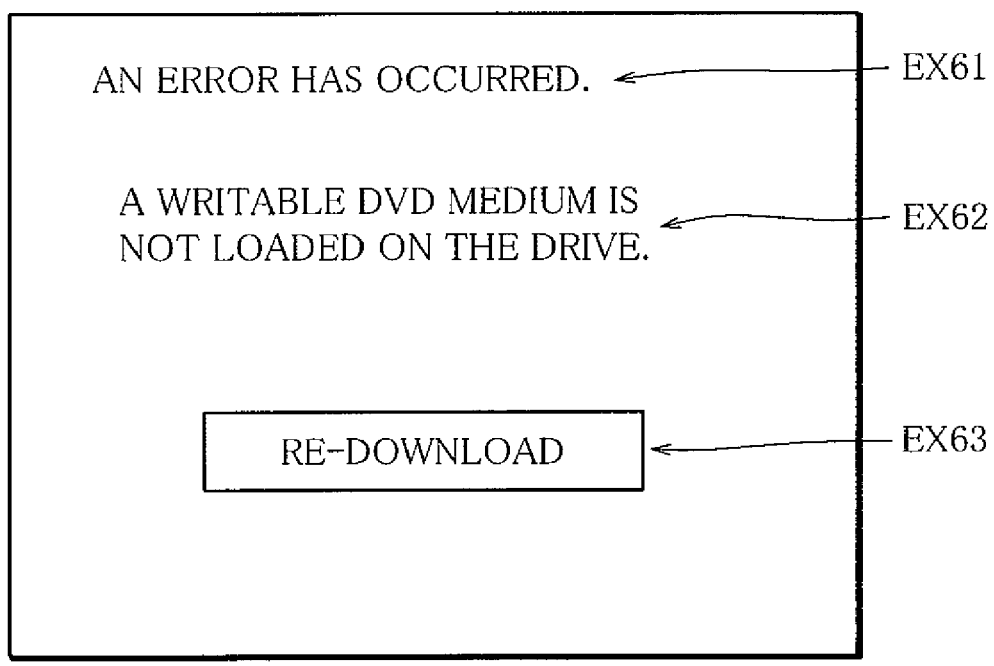
[FIG. 8] A diagram showing an example of a removable medium error indication page.

FIG. 8 shows an example of an error indication page displayed on the display 38 when there exists a removable medium D error. The Figure illustrates how a message title EX61, an error message EX62, and a redo button EX63 are displayed on the display 38. When this error message is displayed, the client 30 stops the procedure until the user loads a writable removable medium D on the drive 35 and presses the redo button EX63.

Referring back to FIG. 3, the description of the flow will be continued. When the user presses the redo button EX 63 (see FIG. 8) after the removable medium D error message is displayed, the client 30 determines whether or not a writable removable medium D is loaded on the drive 35 (S072). If determining that a writable removable medium D is not loaded on the drive 35, the client 30 goes back to step S071 to display, on the display 38 of the client 30, an error message to notify that a writable removable medium D is not loaded, and then repeats the subsequent steps.

When determining that a writable removable medium D is loaded or has been loaded, at step S070 or S072, the client 30 measures the speed of the communication line connecting the client 30 and the server 10 by executing the control programs and the sending program (S080).

The measurement of the connection line speed is performed by the client program Pc installed on the client 30. Specifically, the measurement of the connection line speed is done, for example by the server 10 sending test data to the client 30, where the client program Pc measures the volume of test data received per specified time.

Then, the client 30 obtains the time required to download the selected content item 120 from the server 10 to the client 30 and complete the writing thereof onto the removable medium D (complete the making of a content storage medium Ds), and displays the time required on the display 38 (S090).

Figure 9:
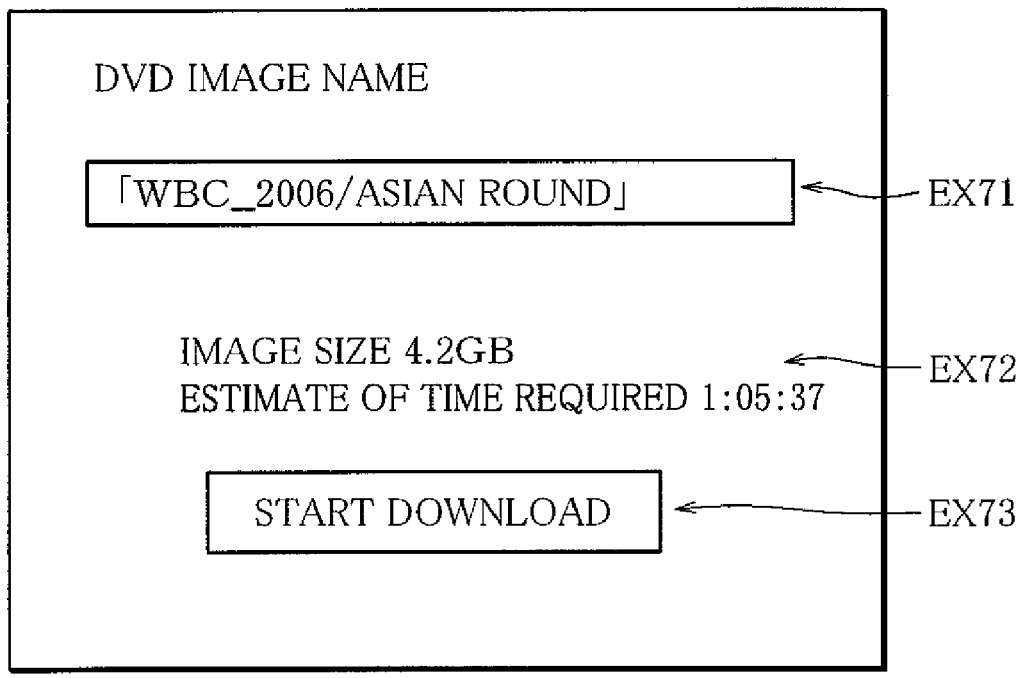
[FIG. 9] A diagram showing an example of a page indicating an estimate of time required to complete making of a content storage medium.

FIG. 9 shows an example of a page indicating the time required to complete the making of the content storage medium Ds, displayed on the display 38. In the example shown in FIG. 9, the title EX71 of the selected content item, the data volume of the selected content item 120, the estimated time EX72 to complete the making of the content storage medium Ds and a process start button EX73 are displayed on the display 38.

Referring back to FIG. 3, the description of the flow will be continued. The client 30 displays the estimate of the time required to complete the making of the content storage medium Ds, on the display 38. Then, when detecting the user's pressing the process start button EX73 (see FIG. 9), the client 30 requests the server 10 to deliver the user's selected content item 120 (S101).

The client 30 performs a receiving/writing process (S100), namely receives and writes blocks of content data 120 successively onto the removable medium D (S102). Here, writing content data blocks 120 on the removable medium D means storing the content data blocks on the removable medium D. The client program Pc writes the received content data blocks 120 directly onto the removable medium D on a block-by-block basis, without once writing all the blocks of downloaded content data 120 onto the hard disk drive 33.

While performing the receiving/writing process (S100), the client 30 estimates and displays progress of the receiving/writing process and remaining time takes to complete making of the content storage medium Ds, on the display 38 of the client 30 (S110).

Figure 10:
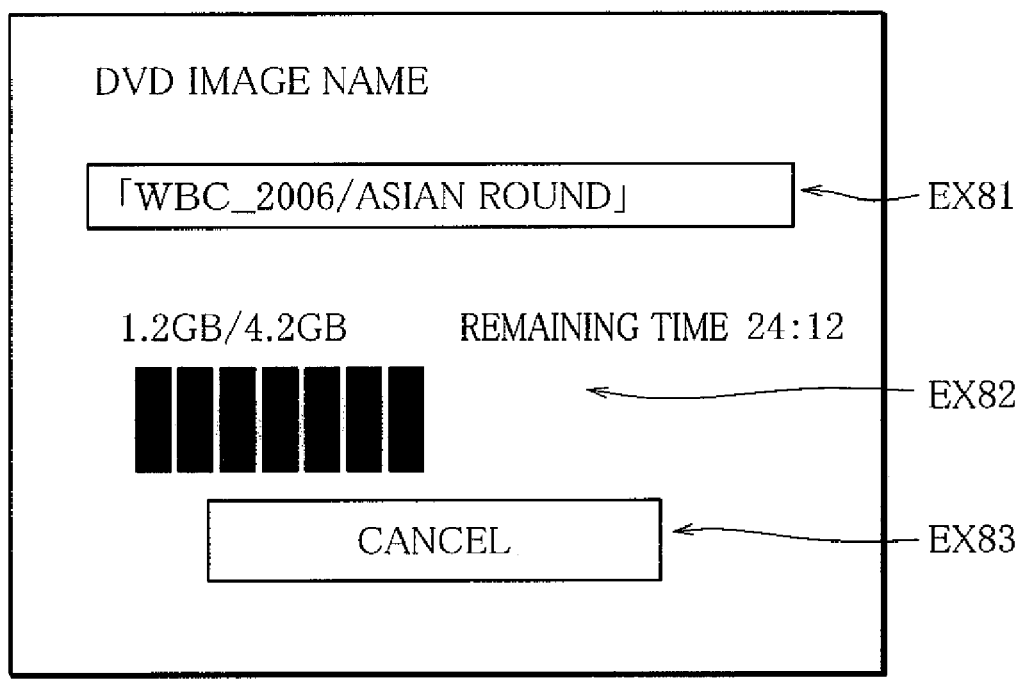
[FIG. 10] A diagram showing an example of a page indicating progress of a sending/writing process and remaining time before making of a content storage medium is completed.

FIG. 10 shows an example of a page indicating the progress of the receiving/writing process and the remaining time takes to complete making of the content storage medium Ds, displayed on the display 38. As shown in the Figure, the title EX81 of the selected content item, progress and remaining time EX82, and a process start button EX83 are displayed on the display 38.

The progress is expressed, for example by the numbers representing the volume of the entire data constituting the selected content item 120 and the volume of data that has been written on the removable medium D. Desirably, the progress should be displayed in the form of a bar graph representing the percentage of the progress. The process start button EX83 is a cancellation button used to discontinue the receiving/writing process.

Referring back to FIG. 3, the description of the flow will be continued. The client 30 obtains and displays the progress of the receiving/writing process and the remaining time takes to complete making of the content storage medium Ds, on the display 38 of the client 30 (S110).

Then, the client 30 determines whether or not the receiving/writing process has finished, namely whether or not the making of the content storage medium Ds has been completed (S120). If the making of the content storage medium Ds has not been completed, the client 30 returns to the step of performing the receiving/writing process (S100) and repeats the subsequent steps. If the making of the content storage medium Ds has been completed, the client 30 displays a page announcing the completion on the display 38 of the client 30 (S130).

Figure 11:
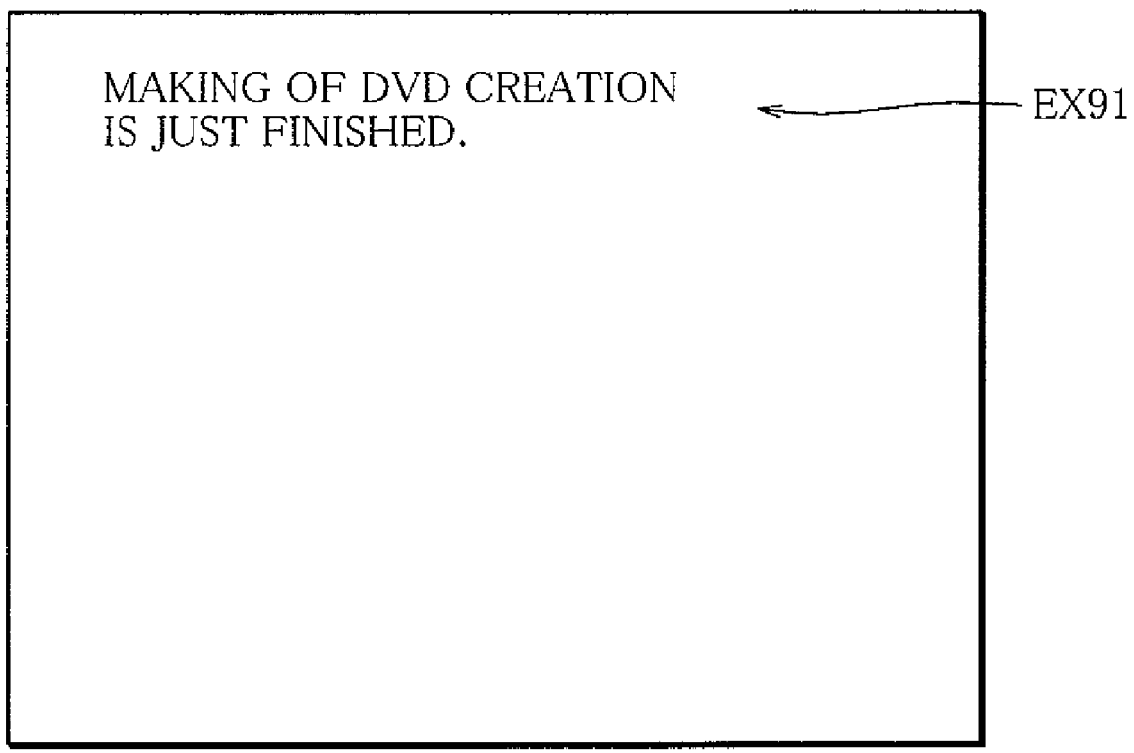
[FIG. 11] A diagram showing an example of a page notifying that making of a content storage medium is completed.

FIG. 11 shows an example of a page indicating that the making of the content storage medium Ds has been completed, displayed on the display 38. In the example shown in the Figure, a message title EX91 is displayed on the display 38. The message title EX91 notifies the user that the making of the content storage medium Ds has succeeded. The user who has seen this message can see and hear the delivered content item by playing back the removable medium D with the content data 120 written on, on the client 30, another PC or a device such as a DVD player.

The content storage medium Ds made by the above-described procedure includes 5.1 channel surround sound data, bilingual (language-switchable) voice data, chapter information or the like written as it is. Thus, the provider can deliver, via the computer network 20, content equivalent to content sold in packages.

It is to be noted that when determining at step S059 that an improper drive has been detected, the client 30 displays on the display 38 a message to notify that writing is discontinued (S140), and terminates the procedure.

Thus, in the content providing system 1 of the present invention, the provider can deliver content to the user via the computer network 20 through the receiving/writing process at step S100, regardless of the physical specification of the client 30, the type of the OS installed on the client 30, etc. Further, the content providing system 1 of the present invention, which delivers content via the computer network 20, can spare the provider unnecessary package production and stock keeping/management. Consequently, the content providing system 1 of the present invention leads to reduction in consumption of packaging materials and removal of stock keeping/management costs. The reduction in consumption of packaging materials is desirable from the global environmental viewpoint. The user, on the other hand, can enjoy the benefit of purchasing content any time through the client 30 connected to the computer network 20, saving a trip to a retail shop.

Further, since the content providing system 1 of the present invention does not allow content data 120 to be written on the hard disk drive 33 of the client 30, downloaded content data 120 does not remain on the client 30. Consequently, the content providing system 1 of the present invention can prevent replication of content against the provider's intention, thereby enabling smooth handling of rights such as copyrights.

The above description of the content providing system 1 according to the present invention has been given on the assumption that the client program Pc is sent from the server 10 via the computer network 20. The content providing system 1 of the present invention may, however, be arranged such that the client program Pc is delivered to the user in advance via a removable medium such as a CD-ROM, for the user to install the client program Pc on the client 30.

It goes without saying that the content providing system of the present invention can use alternative devices or undergo modifications without departing from the spirit and scope of the present invention. For example, the content providing system 1 of the present invention may be configured such that, when delivering content data free from copyrights, the content providing system allows the sending/writing process to be performed without the fixed medium storage prevention program sending means 16, thereby allowing such content data to be written on the hard disk drive 33 of the client 30. Further, in the flowchart shown in FIGS. 2 to 4, a step of charging a fee for the delivery of content and a step of confirmation thereof may be added, for example after the step of measuring the speed of the communication line connecting the client 30 (S080).

Further, it may be modified such that the improper drive detection means 40 is not only run at step S052 but run in parallel with the above-described procedure, as a separate routine, under multitasking control. Further, whether or not an improper drive exists may be determined at any location in the flowchart shown in FIGS. 2 to 4 as long as the entire content data downloaded can be prevented from being written on the hard disk drive 33.

The invention claimed is:

1. A content providing system comprising:
a content providing server including a processor and connected to a network and storing a plurality of items of content; and
a client connected to the network, the content providing server sending requested content data to the client over the network in response to a request from the client to provide at least one of the plural items of content data, the client comprising a drive for writing content data onto a removable medium and a fixed medium device incorporated in the client and configured to read and write data and configured to store the requested content data thereon; and
wherein the content providing server comprises a client program which is sent from the content providing server in response to the request from the client to provide an entire content data, the client program comprising a drive detection program for determining whether the client has the drive, a removable medium detection program for determining whether a writable removable medium is loaded on the drive, and a writing program for writing content data sent from the content providing server onto the removable medium on the client, thereby saving the content data thereon, a storage means for storing each of said plural items of content data, a drive detection program sending means for sending the drive detection program to the client as part of the client program, a removable medium detection program sending means for sending the removable medium detection program to the client as part of the client program, a content data sending means for sending blocks of the requested content data stored in the storage means to the client over the network, each block of requested content data being sent upon the request from the client, and a writing program sending means for sending the writing program to the client as part of the client program;
wherein the client writes the blocks of the requested content data, which are each sent from the content providing server, upon the request from the client, successively onto the removable medium by executing the client program, without storing the entire requested content data on the fixed medium device;
wherein the client program further comprises a fixed medium storage prevention program for execution by the client, which prevents content data received by the client from being written successively on the fixed medium device, thereby preventing the content data from being stored thereon; and
wherein the content providing server further comprises a fixed medium storage prevention program sending means for sending the fixed medium storage prevention program to the client as part of the client program.

2. The content providing system according to claim 1, wherein the client comprises a drive detection means for determining whether the drive exists by executing the client program, a removable medium detection means for determining whether the writable removable medium is loaded on the drive by executing the client program, a determination result sending means for sending determination results generated by the drive detection means and the removable detection means to the content providing server by executing the client program, and a writing means for writing the blocks of the requested content data sent from the content providing server depending on the determination results, each of the blocks of the requested content data being sent upon the request from the client, successively onto a removable medium, thereby saving the content data thereon, by executing the client program.

3. The content providing system according to claim 1, wherein the fixed medium storage prevention program includes an improper drive detection program for determining whether an improper drive for which writing is prohibited in advance is provided on the client, and the client comprises a writing prohibiting means for prohibiting writing onto the removable medium by the writing program, when the improper drive detection program determines that the improper drive for which writing is prohibited is provided on the client.

4. The content providing system according to claim 3, wherein the server comprises a pattern file storage means for storing, as a pattern file, the improper drive detection program regularly updated to prohibit an improper drive from writing on to the removable medium, and a pattern file sending means for sending the improper drive detection program stored in the pattern file storage means to the client; and wherein the client comprises a pattern file receiving means for receiving the improper drive detection program to prohibit the improper drive from writing onto the removable medium sent by the pattern file sending means.

5. The content providing system according to claim 1, wherein the removable medium is an optical disc writable by the drive.

6. The content providing system according to claim 1, wherein the network is the Internet.

7. A method for storing content in which a content providing server, connected to a specific network and storing a plurality of items of content, sends content data over the network to a client connected to the network and comprising a drive for writing each of said plural items of content onto a removable medium and a fixed medium device incorporated in the client and configured to read and write data and configured to store requested content data thereon, in response to a request from a client to provide at least one of said plural items of content, said client writing the content received from the content providing server onto the removable medium, the method comprising the steps of:

sending, from the content providing server to the client, a client program necessary for the client to perform downloads from the content providing server upon receiving the request from the client to provide an item of content;

executing, at the client, the client program to determine whether a removable medium on which an entire requested content data is writable is loaded on the drive, said client requesting the content providing server to start sending the entire requested content data; and sending the entire requested content data to the client depending on results of the determination upon receipt of the request from the client to start sending the entire requested content data;

wherein the client writes blocks of the entire requested content data, which are each sent from the server, upon the request from the client, successively onto the removable medium by executing the client program, without storing the entire requested content data on the fixed medium device;

wherein the client program further comprises a fixed medium storage prevention program for execution by the client, which prevents content data received by the client from being written successively on the fixed medium device, thereby preventing the content data from being stored thereon; and wherein the content providing server further comprises a fixed medium storage prevention program sending means for sending the fixed medium storage prevention program to the client as part of the client program.

8. The method for storing content according to claim 7, wherein the removable medium is an optical disc writable by the drive.

9. The method for storing content according to claim 7, wherein the network is the Internet.

10. A non-transitory computer-readable medium encoded with a client program executed by a client connected to a network, a content providing server connected to a network sending the client program over the network to the client, in response to a request from the client to provide at least one of a plurality of items of content stored in the content providing server, the client comprising a drive for writing content data onto a removable medium and a fixed medium device incorporated in the client and configured to read and write data and configured to store the requested content data thereon, the client program comprising:

program code for determining, by the client, whether a removable medium on which an entire requested content data is writable is loaded on the drive, said client requesting the content providing server to start sending the entire requested content data; and program code for sending the entire requested content data to the client depending on results of the determination upon receipt of the request from the client to start sending the entire requested content data;

wherein the client writes blocks of the entire requested content data, which are each sent from the content providing server, upon the request from the client, successively onto the removable medium by executing the client program, without storing the entire requested content data on the fixed medium device;

wherein the client program further comprises a fixed medium storage prevention program comprising program code for execution by the client, which prevents content data received by the client from being written successively on the fixed medium device, thereby preventing the content data from being stored thereon; and wherein the content providing server comprises a fixed medium storage prevention program comprising program code for sending the fixed medium storage prevention program to the client as part of the client program.

11. A content providing server connected to a network and storing a plurality of items of content for sending requested data over a network to a client connected to the network in response to a request from the client to provide at least one of said plural items of content, and for allowing the client to write content data onto a removable medium, the client comprising a drive for writing the content data onto the removable medium and a fixed medium device incorporated in the client and configured to read and write data and configured to store requested content data thereon;

wherein the content providing server comprises a processor, and a client program which is sent from the content providing server in response to the request from the client to provide an entire content data to enable the client to download content from the content providing server, the client program comprising a drive detection program for determining whether the client has the drive, a removable medium detection program for determining whether a writable removable medium is loaded on the drive, and a writing program for writing content data sent from the content providing server onto the removable medium on the client, thereby saving the content data thereon, a storage means for storing each of said plural items of content data, a drive detection program sending means for sending the drive detection program to the client as part of the client program, a removable medium detection program sending means for sending the removable medium detection program to the client as part of the client program, a content data sending means for sending blocks of the requested content data stored in the storage means to the client over the network, each block of requested content data being sent upon the request from the client, and a writing program sending means for sending the writing program to the client as part of the client program;

wherein the client writes the blocks of the requested content data, which are each sent from the content providing server, upon the request from the client, successively onto the removable medium by executing the client program, without storing the entire requested content data on the fixed medium device;

wherein the client program further comprises a fixed medium storage prevention program for execution by the client, which prevents content data received by the client from being written successively on the fixed medium device, thereby preventing the content data from being stored thereon; and wherein the content providing server further comprises a fixed medium storage prevention program sending means for sending the fixed medium storage prevention program to the client as part of the client program.

12. The content providing server according to claim 11, wherein the network is the Internet.

13. A client connected to a content providing server storing a plurality of items of content via a network to receive content data sent from the content providing server over the network to the client in response to a request from the client to provide at least one of said plural items of content and write the requested content to a removable medium, wherein said client comprises a processor, and a drive for writing content data onto a removable medium, a fixed medium device incorporated in the client and configured to read and write data and configured to store the requested content data thereon, a drive detection means for determining whether the drive exists by executing the client program which is sent from the content providing server to the client in response to the request from the client to provide an entire content data, a removable medium detection means for determining whether a writable removable medium is loaded on the drive by executing the client program, a determination result sending means for sending determination results generated by the drive detection means and the removable detection means to the content providing server by executing the client program, and a writing means for writing blocks of content data sent from the content providing server depending on the determination results, each of the blocks of content data being sent upon the request from the client, successively onto a removable medium, thereby saving the content data thereon, by executing the client program, without storing the entire content on the fixed medium device;

wherein the client program further comprises a fixed medium storage prevention program for execution by the client, which prevents content data received by the client from being written successively on the fixed medium device, thereby preventing the content data from being stored thereon; and wherein the content providing server further comprises a fixed medium storage prevention program sending means for sending the fixed medium storage prevention program to the client as part of the client program.

14. The client according to claim 13, wherein the network is the Internet.

* * * * *